Sept. 19, 1967

H. E. TEMPLE 3,342,018

DELIDDING AND CONVEYING MECHANISM

Filed July 23, 1964

INVENTOR.
HIRAM E. TEMPLE
BY Learman, Learman & McCulloch
ATTORNEYS

Sept. 19, 1967     H. E. TEMPLE     3,342,018

DELIDDING AND CONVEYING MECHANISM

Filed July 23, 1964     3 Sheets-Sheet 2

INVENTOR.
HIRAM E. TEMPLE

BY *Learman, Learman & McCulloch*

ATTORNEYS

Sept. 19, 1967 H. E. TEMPLE 3,342,018
DELIDDING AND CONVEYING MECHANISM
Filed July 23, 1964 3 Sheets-Sheet 3

INVENTOR.
HIRAM E. TEMPLE
BY
Learman, Learman & McCulloh
ATTORNEYS

United States Patent Office 3,342,018
Patented Sept. 19, 1967

3,342,018
DELIDDING AND CONVEYING MECHANISM
Hiram E. Temple, Saginaw, Mich., assignor to Baker Perkins Inc., Saginaw, Mich., a corporation of New York
Filed July 23, 1964, Ser. No. 384,617
9 Claims. (Cl. 53—381)

This invention relates to delidding and/or conveyor mechanisms and more particularly to a lid carrying, conveyor mechanism which may be employed in a bakery product, depanning machine for removing Pullman and other lids from pansets containing the baked products and conveying them to a lid collecting or receiving device.

Briefly, the invention is concerned with magnetizable traveling conveyor elements having a path of travel which disposes them just above a lidded panset traveling at substantially the same speed as the magnetizable conveyor elements, and means creating a magnetic field of sufficient strength to lift the lids from the pansets to the conveyor elements while, at the same time, magnetizing the traveling conveyor elements sufficiently to maintain their operative position, the conveyor elements proceeding in a divergent path relative to the delidded pansets so that the lids can be carried to a remote point for collection.

Prior art constructions of the character desscribed have employed non-magnetizable, endless belts traveling under stationary, permanent magnet rails arranged crosswise to the path of the belts, which exerted a magnetic attraction through the belts adequate to hold lids being transferred to the belts. Certain difficulties have been experienced with such belts, which were formed of fabric, because a certain amount of gap or sag was required between the endless fabric belts and the elements around which they traveled. In other words, the belts could not be of such size that they tightly embraced the guides around which they traveled because frictional and binding resistances would prevent them from traveling. Such fabric belts were made as tight and as thin as possible but, when this was done, the lacing joining the ends of the endless fabric belts together tended to pull apart. Further, because some sag was unavoidable, difficulties were encountered in keeping the belts centered. Since only a limited magnetic attraction could be exerted without the lids acting as brakes to prevent the belts from moving, the length of the system was limited in the sense that only a certain number of pans could be carried without overloading the system to the point where it could not carry all the lids or slippage occurred and the lids would crowd up and displace one another.

One of the prime objects of the present invention is to design a delidding conveyor construction in which belt sag is no problem and which need not be limited in length for fear of overloading the conveyor system.

A further object of the invention is to provide a more sanitary delidding conveyor mechanism of the character described and one in which the distance between the lids on the pansets and the path of the conveying elements at the time delidding is accomplished is not as critical as is the case when fabric belts are employed.

Another object of the invention is to provide safe, positive holding, conveying elements capable of swiftly conveying pan lids at an upwardly inclined angle so as not to interfere with other operating elements of the depanning mechanism.

A further object of the invention is to design relatively economical and simple delidding conveying mechanism of highly reliable character which is well suited to the operation to be performed.

A still further object of the invention is to design a construction capable of developing relatively high and uniform holding forces which operate to securely retain the lids without unduly impeding the traveling conveyor members, the traveling conveyors being commercially available elements which have rolling contact with the members on which they guide.

Other objects and advantages of the invention will be pointed out specifically or will become apparent from the following description when it is considered in conjunction with the appended claims and the accompanying drawings, in which:

Figure 1:
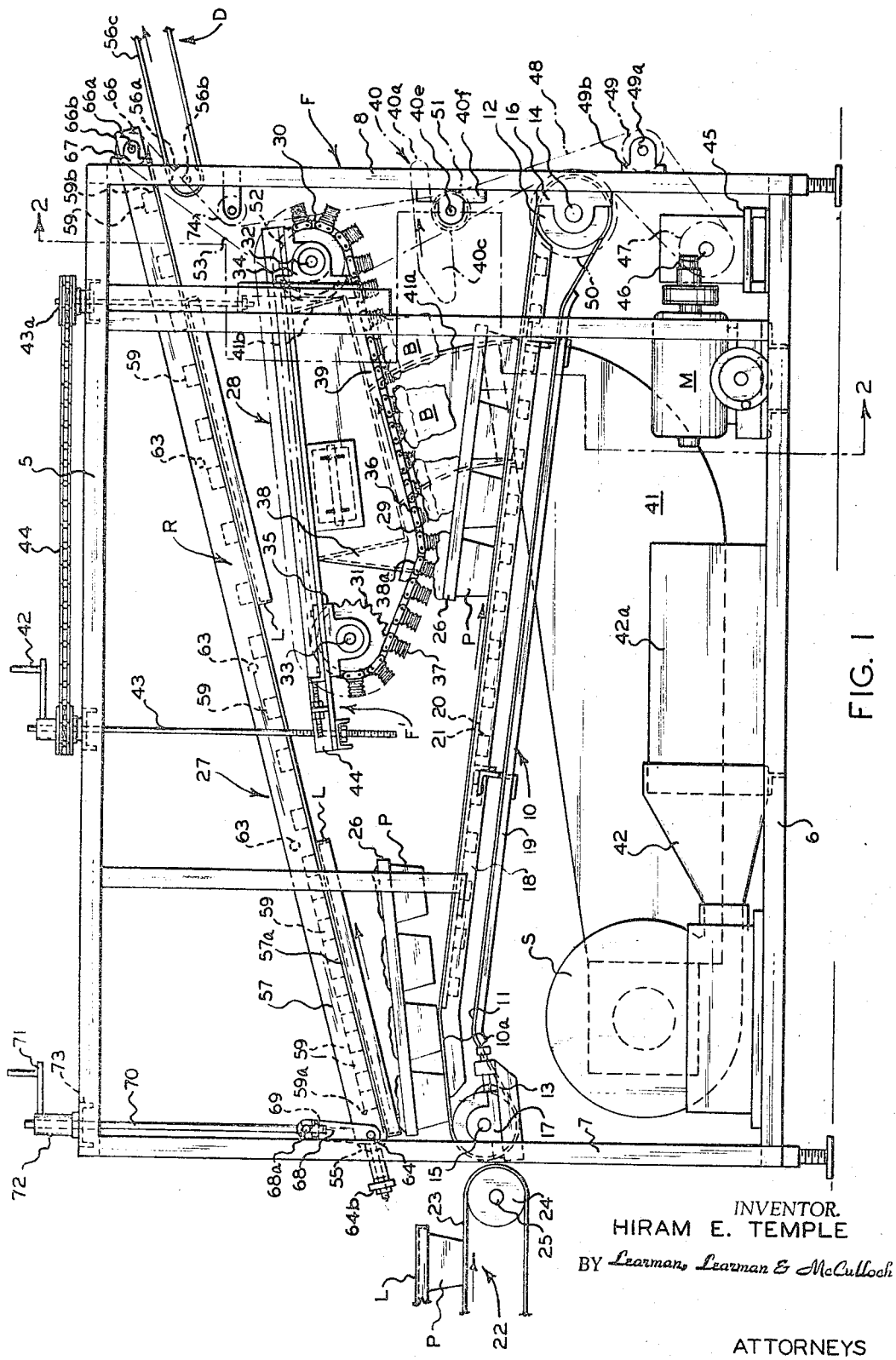
FIGURE 1 is a side elevational view of a depanning machine incorporating the delidding conveying mechanism described.
Figure 2:
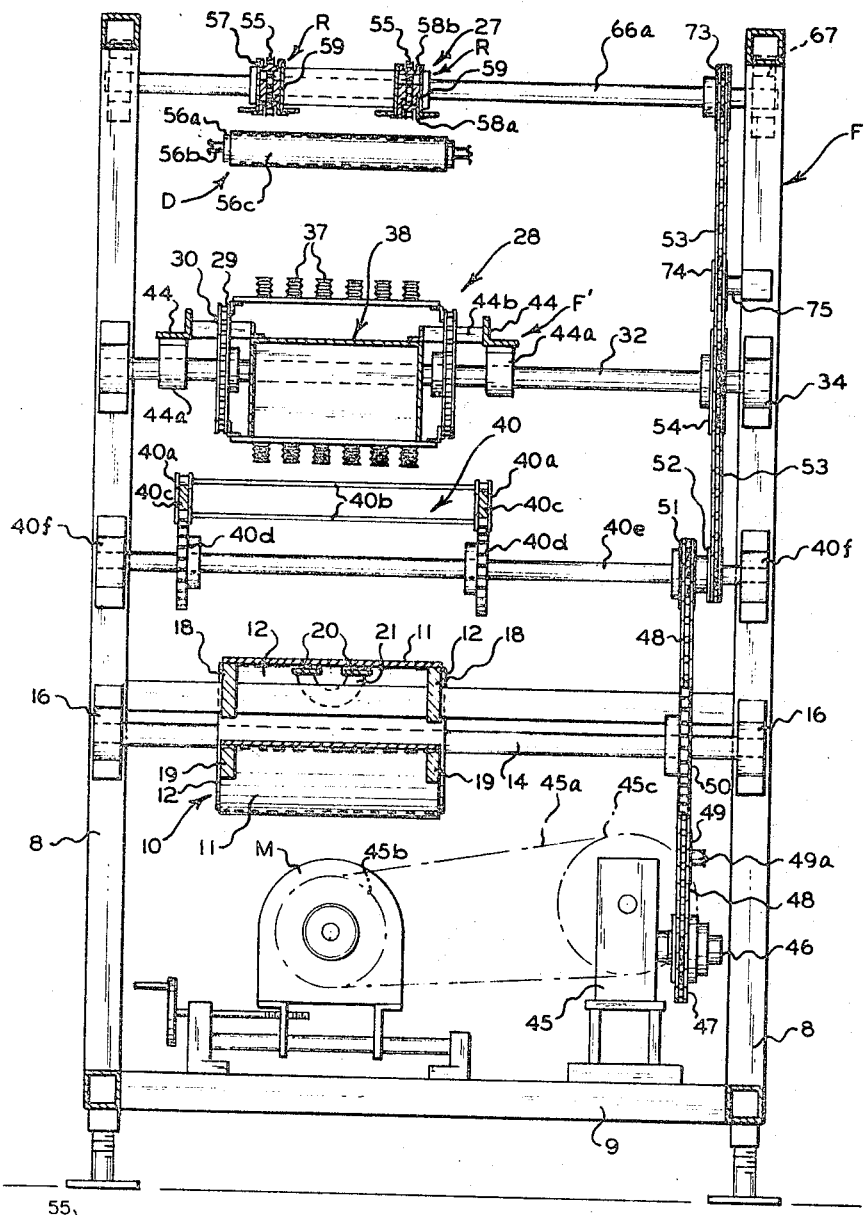
FIGURE 2 is a transverse, sectional, elevational view thereof taken on the line 2—2 of FIGURE 1, omitting some of the elements of the depanning machine in the interests of clarity.

Referring now more particularly to the accompanying drawings, in which, in FIGURES 1 and 2, a depanning machine is shown, a letter F generally indicates the generally oblong framework of the machine, which is a machine of the general character described in my U.S. Patent No. 3,170,581. The disclosure of this patent is incorporated herein by reference and, accordingly, the various elements of the depanning machine will be only briefly described.

The framework F may include upper and lower side members 5 and 6 connected by front and rear vertical end members 7 and 8 and by transverse rails 9. As in the aforementioned patent, a panset conveying endless conveyor generally designated 10 is provided for carrying pansets P from left to right in the machine. The conveyor mechanism 10 may comprise an endless, non-magnetic belt 11 trained around front and rear rolls 12 and 13, with the rolls 12 and 13 being fixed on shafts 14 and 15, respectively, and supported by bearings 16 and 17, respectively. Upper and lower stationary support guide members 18 and 19 may be provided for the belts 11 at the sides thereof and spaced apart permanent magnet strips 20, connected as at 21, may be provided for holding the pansets P on the conveying surfaces of belts 11. A supply conveyor generally designated 22, and comprising an endless belt 23 trained around a driven end roll 24 mounted on a drive shaft 25, may be provided for feeding pansets P with lids L to the conveyor 10, the lids L fitting down over the rectangular pan straps 26 which, in the present instance, connect four crosswisely disposed pans of the type used for baking bread.

The invention is principally concerned with the delidding conveyor mechanism which is employed to remove the lids L from the pansets P to expose the upper surfaces of the baked bread loaves B in the pansets P. However, prior to describing the delidding conveyor means, generally designated 27, in detail, other elements of the depanner will be briefly described so that their relationship with the conveying mechanism 27 will be understood.

Mounted just under the lid transporting conveyor assembly 27 at the front end of the machine is the depanning conveyor assembly, generally designated 28, which is constructed as disclosed in the aforementioned patent and comprises endless chain members 29 trained around front and rear sprockets 30 and 31 fixed on front and rear shafts 32 and 33 which are journaled by bearings 34 and 35, respectively. The pair of endless chains 29 are connected by bars 36 which mount suction cup members 37 in the manner previously disclosed and it will be observed that the lower run of the conveyor 28 travels directly under a suction enclosure 38 which has a open bottom at 38a.

The depanning suction belt assembly 28, including the suction enclosure 38, are supported by a subframe F' for vertical pivotal movement around shaft 32 to provide for vertical adjustment of the conveyor 28 relative to the conveyor 10. Mounted by the subframe F' are side guides 39 around which the chains 29 travel and it will be noted that these guides diverge upwardly, away from the conveyor 10, to provide space at the front end of the machine for a discharge conveyor generally designated 40 which may comprise a pair of chain conveyors 40a connected by slats 40b and trained around side guide members 40c and drive sprockets 40d. The conveyor 40 is in position to receive the loaves of bread B which are carried upwardly away from the pansets P by the suction cup members 37. When the suction cup members 37 pass beyond the open bottom end of the suction of closure 38 the bread B is transferred to the traveling conveyor 40 in the manner described in the previously mentioned patent. A drive shaft 40e mounts the sprockets 40d and is journaled in bearings 40f.

A suction fan S is mounted on a platform supported by the framework F and is coupled to an inlet duct 41 leading to a vertically extending, and preferably flexible, conduit portion 41a which connects into a header 41b extending into the side of the suction closure 38. The fan S has an outlet side 42 connected to an outlet conduit 42a.

Threaded adjusting shafts 43 and 43a, which may be manipulated by a handle H, permit vertical adjustment of the subframe F' supporting the suction closure 38 and endless suction belt assembly which incorporates suction cups 37. The shaft 43a may be connected to the shaft 43 by an endless chain member 43b in the usual manner. The subframe F' which mounts the bearings 35 preferably includes side rails 44 having dependent bearings 44a which pivotally support the subframe F' from the shaft 32 (see FIGURE 2). Braces 44b (FIGURE 2) connect the suction enclosure 38 to the rails 44.

The elements thus far described may be driven by a motor M coupled to a speed reducing mechanism 45 having an output shaft 46 mounting a sprocket 47 around which a drive chain 48 is trained. A belt 45a may be employed to connect the pulley 45b on the output shaft of motor M to the pulley 45c on the input shaft of reducer 45. The chain 48 also is trained around an idler sprocket 49 supported on a shaft 49a journaled by bearings 49b on the framework F, and around the sprocket 50 provided on the drive shaft 14 of the panset conveyor 10 to drive the panset conveyor. The chain 48 also trains around the sprocket 51 mounted on the shaft 40e to drive the loaf discharge belt assembly 40. A sprocket 52 mounted on shaft 40e drives a second chain 53 which is trained around the drive sprocket 54 on the shaft 32 to drive the depanning conveyor 28. The mechanism thus far described is described in some detail in the aforementioned patent and the elements employed conjunctively therewith to delid the pans which are delivered to the conveyor 10 and which form the substance of the present invention will now be described.

Figure 3:
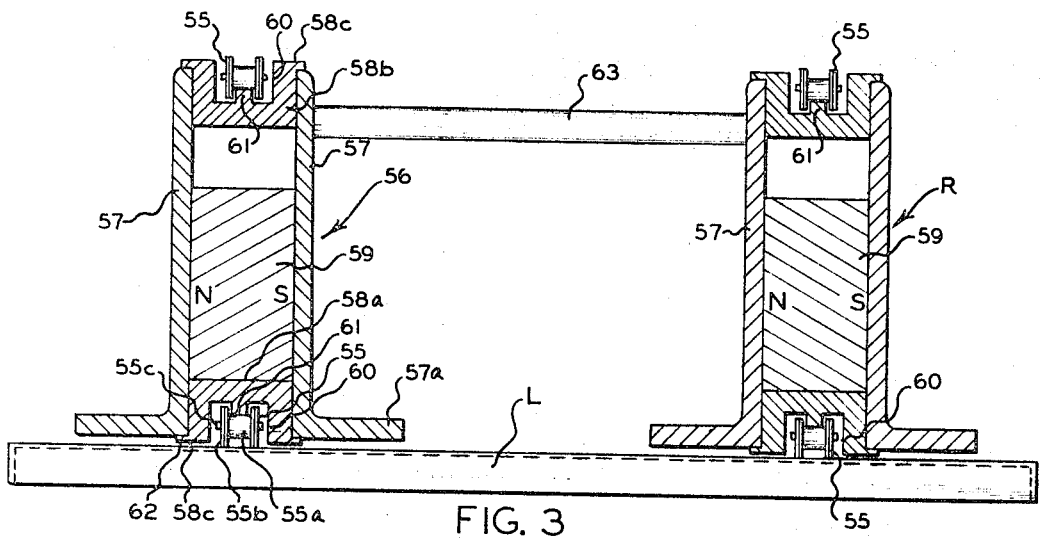
FIGURE 3 is an enlarged, transverse, sectional view of the pair of paramagnetic rail housings making up the lid conveying assembly and a lid which is being transported.

The delidding conveyor assembly 27 includes a pair of spaced apart, endless roller conveyor chains 55 which, at the rear end of the machine, pass in close proximity to the lids L on pansets being delivered to the conveyor 10 and lift the lids from the pansets P and convey them to the front end of the machine to a discharge conveyor, such as the conveyor generally designated D, which might comprise a belt conveyor 56 trained over a roll 56a mounted on a drive shaft 56b which drives the upper run of the endless belt 56c in the direction indicated. The chains 55 may be the A.S.A. standard roller chains manufactured by Chain Belt Company of Milwaukee, Wis., which include rollers 55a rotatably mounted between the side links 55b which are connected by pins 55c. Each of the chains 55, as shown in FIGURE 3, is employed conjunctively with a longitudinally extending, magnetic rail housing generally indicated by the letter R which includes a pair of spaced apart angle plates 57 formed of a magnetizable ferrous material. The plates 57 are connected at their upper and lower ends by guide strips or bars 58a and 58b, respectively, which are formed of aluminum or some other substantially non-magnetizable material. Fixed between the plates 57 are a plurality of longitudinally arranged, permanent magnet bars 59 which may be larger in size and more closely spaced, or even adjacent, at the rear end of the depanning machine where the lids L are to be lifted off the pansets P and a little more widely spaced throughout the remaining extent of the conveyor assembly 27. The strips 58a and 58b include feet portions 58c which overlie the lower and upper ends of the side plates 57 to position the members 58a and 58b relative to the housings 56. It will be further noted that the guide strips 58a and 58b are recessed as at 60 to provide a space within which the roller chains 55 may be accommodated and that centrally disposed, projecting ribs 61 are provided within the recessed portions 60 of the strips 58a and 58b against which the rollers 55a of the chains 55 engage and guide.

The permanent magnet bars 59 extend from the rear end of conveyor 27 to the front end thereof from the end 59a to the end 59b and terminate at 59b so that the lids L drop under the influence of gravity to the discharge conveyor D. It will be observed that the side plates 57 are formed with laterally extending bottom flanges 57a, which create large area magnetic field. However, actual engagement of the lids L with the assemblies R is limited to the engagement of the lower edges of the links 55b of the chains 55 with the lids L, the links 55b projecting downwardly an incremental distance below the feet portions 58c of the non-magnetic guide strip 58a so as to leave an air gap 62 between the lids L and the feet portions 58c as the lids L are transported upwardly by the conveyor 27. Magnets 59 may be the conventional alnico permanent magnets manufactured by Eriez Manufacturing Company, of Erie, Pa. A wide variety of high power, permanent magnet materials of this character is available and, more recently, ceramic, permanent magnet materials have also become available which are characterized by their shallow but strong holding forces and strong resistance to demagnetizing influences. The Index V rails, such as models 3091–3094, manufactured by Indiana General Corporation, of Milwaukee, Wis., are also well suited to use in this delidding operation. Generally speaking, the force or pull of a magnet is inversely proportional to the square of the distance from the magnet and there is a saturation effect which limits the amount of magnetic field that a ferrous object or material can carry, and hence limits the attractive pull which can be exerted on that object. In the present instance, the magnet bars 59 create magnetic fields in the lateral extensions 57a of the side plates 57, which exert enough attraction to lift each lid L and hold it in place on the chains 55. The chains 55 themselves are only magnetized sufficiently so that they are held upwardly against the ribs 61 and do not sag at a time when portions of them may not be carrying lids.

Figure 4:
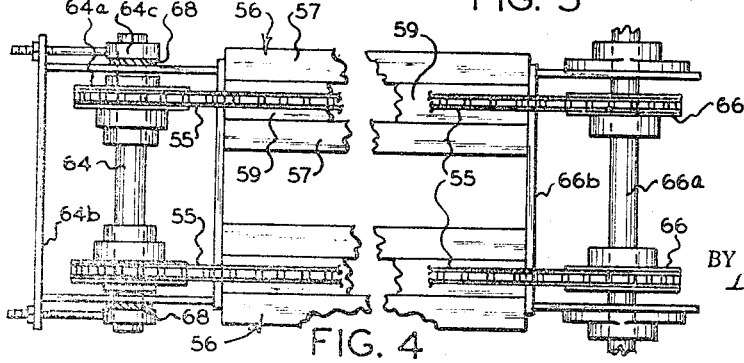
FIGURE 4 is a top plan view of the lid conveying assembly.

While the lids L are in effect lifted and carried by the flange portions 57a of side plates 57, they do not engage the flange portions 57a and only the relatively small area, bottom surfaces of the ribs 61 engage the rollers 55a of the roller chain. Preferably, both the connecting links 55b and the rollers 55a are formed of a ferro-magnetic material. However, either the rollers 55a or the links 55b may be formed of nylon to provide a more durable construction. Generally speaking, the magnetic field acting upon the chains 55 should only be strong enough to hold the chains 55a in engagement with the ribs 61 so that frictional and binding forces are minimized. At the flange portions 57a the field must be strong enough to lift the lids L through a gap of from ½ to ¾ of an inch and to support them in their upward travel along the length of conveyor assembly 27 to the discharge conveyor 56. Typical lids may range from 9 x 18 inches to 18 x 32 inches, and these lids may weigh from eight to twenty pounds, depending on their construction. The apparatus also is well suited to delidding the half-cylindrical lids from pansets formed of half-cylindrical pans used in the baking of cylindrical loaves of bread. The housings 57 may be connected together by rods 63 which are formed of aluminum or another non-magnetizable material so that they do not short-circuit the magnetic field. Preferably, the magnets 58 are magnetized in the manner indicated in the drawings, once the rail assemblies R have been fabricated. Where a plurality of more closely spaced magnetic rails R are employed, the north and south poles of the magnets 58 in the rail assemblies R will be positioned so that they repel each other. In other words, the adjacent ends of the magnets in the rail assemblies R will be both of south polarity or north polarity. At the front end of the machine the chains 55 are trained around sprockets 64a (FIGURE 4) fixed on a shaft 64 supported by a rectangular bracket 64b having bearings 64c which is of non-magnetizable material so that it will not short-circuit the magnetic fields created. Similarly at the rear end of the machine the chains 55 are trained around sprockets 66 which are mounted on a drive shaft 66a, there being a similar U-shaped bracket 66b supporting the conveyor assembly 27 on the shafts 66a for pivotal movement. As shown in FIGURE 2, the shaft 66a is journaled by bearings 67.

The manner of support of the conveyor 27 by the framework F is unimportant to the invention except that, desirably, the rear end is mounted so that it can be vertically adjusted to vary the air space between the lids L and the lower edges of chains 55 at the time the pansets P on the conveyor 10 pass under the edges 57a of the magnetic rails R. Preferably, this air space is ½ to ¾ of an inch.

In the present illustration, a pair of front end plates 68 may be secured to the bearings 64c. Fixed between plates 68 on a connecting bar 68a is a nut 69 through which a threaded shaft 70 extends which may be rotated by a handwheel 71. The handwheel 71 has a sleeve 72 which fixes to the upper end of the shaft 70 and restrains axial movement of the shaft 70 while permitting rotation thereof. Accordingly, rotation of the shaft 70 will move the nut 69 and rear end of assembly 27 upwardly or downwardly and thereby swing the front end of the conveyor 27 upwardly or downwardly about the shaft 66a as a pivot. The shaft 66a may be driven by the chain 53, there being a sprocket 73 fixed on the shaft 66a around which the chain 53 is trained. Preferably, an idler sprocket 74 mounted on a shaft 75 is also provided for the chain.

In operation, the pansets P bearing lids L are delivered from the conveyor 22 to the conveyor 10 and proceed first of all along an upwardly inclined portion 10a thereof. As the front end of the lid L passes under the rear end 58a of the rear magnet 58, it is lifted a distance of from ½ to ¾ of an inch by the magnetic field. The chain conveyors 55 move at the same linear speed as the belt 11, and the lids L are simply moved along with the chains 55 until the rear end of the pansets P approaches the conveyor portion 10a. At about this time, the magnetic field is exerting a pull of such force as to snap the rear end of the lid L upwardly so that the entire lid L is in engagement with the chains 55 and is moving therewith. The pansets P proceed downwardly on the conveyor 10 and the loaves of bread B are removed from them by the suction cups 37 and delivered to the conveyor 30 in the manner previously described. The portion 10a of the conveyor is provided because it is desirable for the front end of the pansets P to initially travel somewhat along the line of the upwardly inclining conveyor 27.

Figure 5:
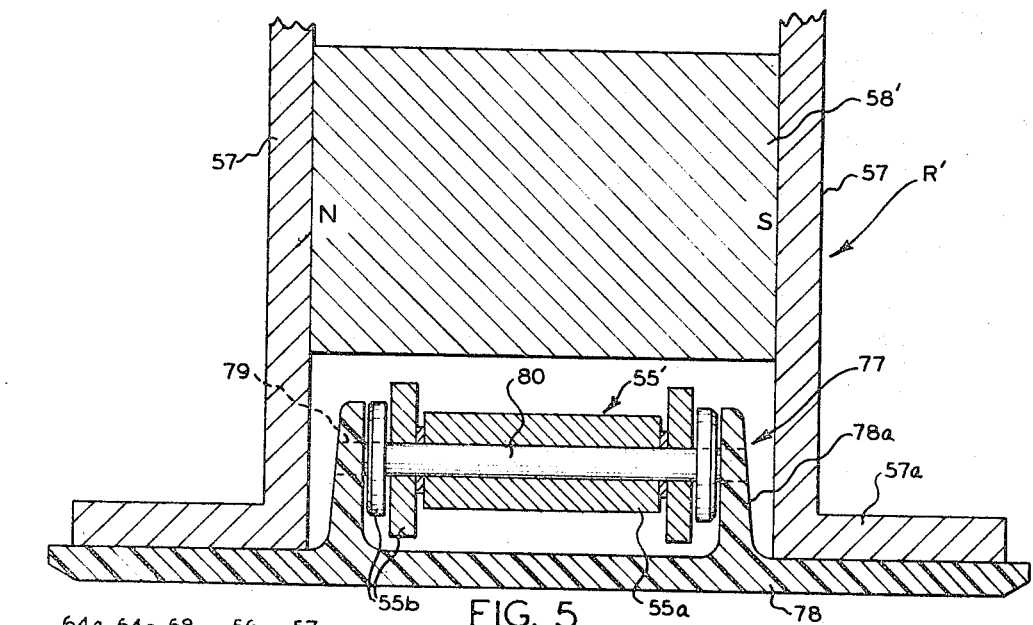
FIGURE 5 is a considerably enlarged, transverse, sectional view of a modified form of paramagnetic rail housing.

In FIGURE 5 a modified form of the invention is disclosed in which only one of a pair of housings 56' is illustrated. As previously, the magnetic rail housing includes the side plates 57 with the laterally extending flanges 57a. A series of permanent magnets 58' are fixed between the plates 57 as shown. Instead of the A.S.A. standard roller chain previously provided, a plate top roller chain generally designated 77 is employed. The plate top roller chain may be the Rex model N–863, manufactured by the Chain Belt Company, of Milwaukee, Wis., which has a nylon or delrin plastic plate 78 connected to each link assembly of the chain. The plastic plates 78 includes ears 78a with openings 79 through which the extended pins 80 of the roller chain 55' extend. Otherwise, the roller chain is exactly as previously described and includes rollers 55a and roller links 55b.

Figure 6:
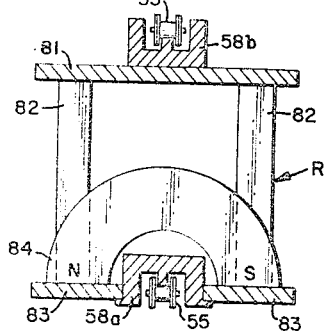
FIGURE 6 is a view similar to FIGURE 3 of still another embodiment of the invention.

In FIGURE 6 a further embodiment of the invention is shown in which a single elongate housing R" comprises a top plate 81 and side rails 82 similar to the rails 57 except that bottom plates 83 are provided instead of the integral flanges 57a. The chain guides 58a and 58b are provided as previously and the magnetizable roller chain 55 similarly is trained around sprockets 64a and 66 as in FIGURE 4 so that the assembly may be adjustably supported in the same maner. Instead of the permanent magnet bars 59, longitudinally spaced, horseshoe-shaped, permanent magnets 84 are provided connecting the magnetizable plates 83 as shown. In this version of the invention the side rails 82 as well as the guide plates 58a and 58b are formed of a substantially non-magnetizable material such as aluminum so that the magnetic fields created by the magnets 84 will not be short-circuited.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. Conveyor mechanism comprising: longitudinally extending, endless conveyor means; a pair of transversely spaced apart, longitudinally extending chain carrying housing members disposed above said endless conveyor means; a pair of endless, magnetizable roller chains having lower runs forming bottom portions of said housings and projecting slightly below other portions of said housings, each housing comprising transversely spaced apart, magnetizable side members with generally horizontally, outwardly extending flanges thereon; permeanent magnet means mounted between said side members; and guide track means carried by said side members for engaging only the rollers of said endless conveyor chains.

2. Delidding conveyor mechanism comprising: longitudinally extending, endless conveyor means for conveying bakery pan means with magnetizable lids; a pair of transversely spaced apart, longitudinally extending, chain carrying, housing members disposed above said endless conveyor means in divergent relationship therewith; a pair of endless, magnetizable, roller chains having lower runs forming bottom portions of said housings and projecting slightly below other portions of said housings, each housing comprising transversely spaced apart, magnetizable, side members with generally horizontally, outwardly extending flanges thereon; and permanent magnet bar means mounted between said side members; and guides carried between said side members and projecting slightly below said flanges, said guide means being longitudinally channeled to receive all but the lower portions of said chains and having a longitudinally extending central guide rib means engaged by the rollers of said chains; the magnet bar means creating magnetic fields in said flanges with attractive pull sufficient to lift the lids from the pan means and transport them along said housing members in engagement with said chains.

3. Conveyor mechanism comprising: longitudinally extending, chain carrying means; a magnetizable endless roller chain extending along a bottom portion of said chain carrying means and projecting slightly below other portions thereof; means for driving said chain; said chain carrying means including non-magnetizable guide track means supported above said chain and permanent magnet means mounted on said chain carrying means to magnetize said chain along its lower run; said track means having longitudinally extending guide surface rib means disposed so as to be engaged only by the rollers of said chain which, due to the magnetic field created, is held upwardly to engage said guide surface means.

4. Delidding conveyor mechanism comprising: longitudinally extending, endless conveyor means for conveying bakery pan means with magnetizable lids; longitudinally extending, chain carrying means disposed above said endless conveyor means in divergent relationship therewith; a magnetizable endless chain having a lower run extending along the bottom of said chain carrying means and projecting slightly below said chain carrying means; means for driving said chain; said chain carrying means including: transversely spaced apart magnetizable plate means extending generally laterally relative to said chain; magnet means having transversely spaced opposite pole ends for magnetizing said chain and plate means along said lower run; the magnet means creating a magnetic field including said lower run for creating attractive magnetic pull sufficient to lift the lids from the pan means and transport them along and beneath said plate means in engagement with said chain and to hold said chain upwardly.

5. Conveyor mechanism comprising: longitudinally extending conveyor means for conveying magnetizable articles; longitudinally extending, load bearing, chain carrying means disposed adjacent said first conveyor means; magnetizable endless chain means having a run extending along said chain carrying means and projecting slightly beyond said chain carrying means; means for driving said chain means; said chain carrying means including: transversely spaced apart magnetizable members at the sides of said chain means; permanent magnet means having transversely spaced opposite pole ends for magnetizing said chain means and magnetizable members along said run; the magnet means creating a magnetic field including said run for creating attractive magnetic pull sufficient to lift the articles and transport them along said members in engagement with said chain means and to hold said chain means upwardly.

6. The combination defined in claim 5 in which said transversely spaced, magnetizable members comprise chain means straddling members with generally laterally extending surfaces; and non-magnetic guide strip means is supported between said members on which said chain means travels.

7. The combination defined in claim 6 in which said conveyor means and endless chain means are mounted in juxtaposed divergent relationship and said chain means and conveyor means are driven at approximately the same forwarding speed, the conveyor means and endless means diverging in the forwarding direction.

8. The combination defined in claim 7 in which said members comprise side walls for said chain carrying means.

9. The combination defined in claim 8 in which said chain means comprises a pair of endless chains, each of which is straddled by a pair of said side walls; and non-magnetic brace means connects said pairs of side walls.

References Cited

UNITED STATES PATENTS

| | | | |
|---|---|---|---|
| 2,600,475 | 6/1952 | Buccicone | 198—41 |
| 2,668,002 | 2/1954 | Temple | 53—381 |
| 2,675,953 | 4/1954 | Van Poolen | 53—381 |
| 2,683,560 | 7/1954 | Keller | 53—381 |
| 2,954,113 | 9/1960 | Hibbard et al. | 198—189 |
| 3,057,497 | 10/1962 | Stadelman | 214—304 |

ROBERT C. RIORDON, *Primary Examiner.*

FRANK E. BAILEY, *Examiner.*

R. J. ALVEY, *Assistant Examiner.*